(12) United States Patent
Konduru et al.

(10) Patent No.: US 9,479,402 B2
(45) Date of Patent: *Oct. 25, 2016

(54) EXTERNAL SERVICE PLANE

(71) Applicant: Juniper Networks, Inc., Sunnyvale, CA (US)

(72) Inventors: Satyadeva Konduru, San Jose, CA (US); Sameer Nanajkar, Bangalore (IN); Shashidhar Patil, Bangalore (IN); Sankar Ramamoorthi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,116

(22) Filed: Jul. 31, 2015

(65) Prior Publication Data

US 2015/0358243 A1 Dec. 10, 2015

Related U.S. Application Data

(63) Continuation of application No. 13/688,718, filed on Nov. 29, 2012, now Pat. No. 9,100,342.

(51) Int. Cl.
*H04L 12/24* (2006.01)
*H04L 12/851* (2013.01)

(52) U.S. Cl.
CPC ........... *H04L 41/5041* (2013.01); *H04L 41/50* (2013.01); *H04L 41/5003* (2013.01); *H04L 41/5019* (2013.01); *H04L 47/2425* (2013.01)

(58) Field of Classification Search
CPC .............. H04L 45/50; H04L 41/5003; H04L 41/5006; H04L 41/5019; H04L 47/2425
See application file for complete search history.

(56) References Cited

U.S. PATENT DOCUMENTS

| | | | | |
|---|---|---|---|---|
| 7,010,615 | B1 * | 3/2006 | Tezuka | H04L 67/14 709/224 |
| 7,948,986 | B1 * | 5/2011 | Ghosh | H04L 45/50 370/392 |
| 8,259,722 | B1 * | 9/2012 | Kharitonov | H04L 43/028 370/392 |
| 9,100,342 | B1 | 8/2015 | Konduru et al. | |
| 2009/0003364 | A1 * | 1/2009 | Fendick | H04L 45/00 370/401 |
| 2009/0010171 | A1 * | 1/2009 | Gupta | H04L 41/0659 370/244 |
| 2009/0172092 | A1 * | 7/2009 | Nakagawa | H04N 7/17354 709/203 |
| 2013/0325709 | A1 * | 12/2013 | Pollin | G06Q 20/102 705/40 |

FOREIGN PATENT DOCUMENTS

WO          WO0208487        *  5/2000

* cited by examiner

*Primary Examiner* — Omer S Mian

(74) *Attorney, Agent, or Firm* — Harrity & Harrity, LLP

(57) ABSTRACT

A network device may receive network traffic from a first device. The network device may identify, based on the network traffic and a service level agreement, stored by the network device, that a service is to be applied to the network traffic. The network device may send the network traffic to a second device, the second device using a service plane to apply the service to the network traffic. The network device may receive the network traffic from the second device, the network traffic having the service applied by the second device; and send the network traffic, having the service applied by the second device, to a third device.

17 Claims, 11 Drawing Sheets

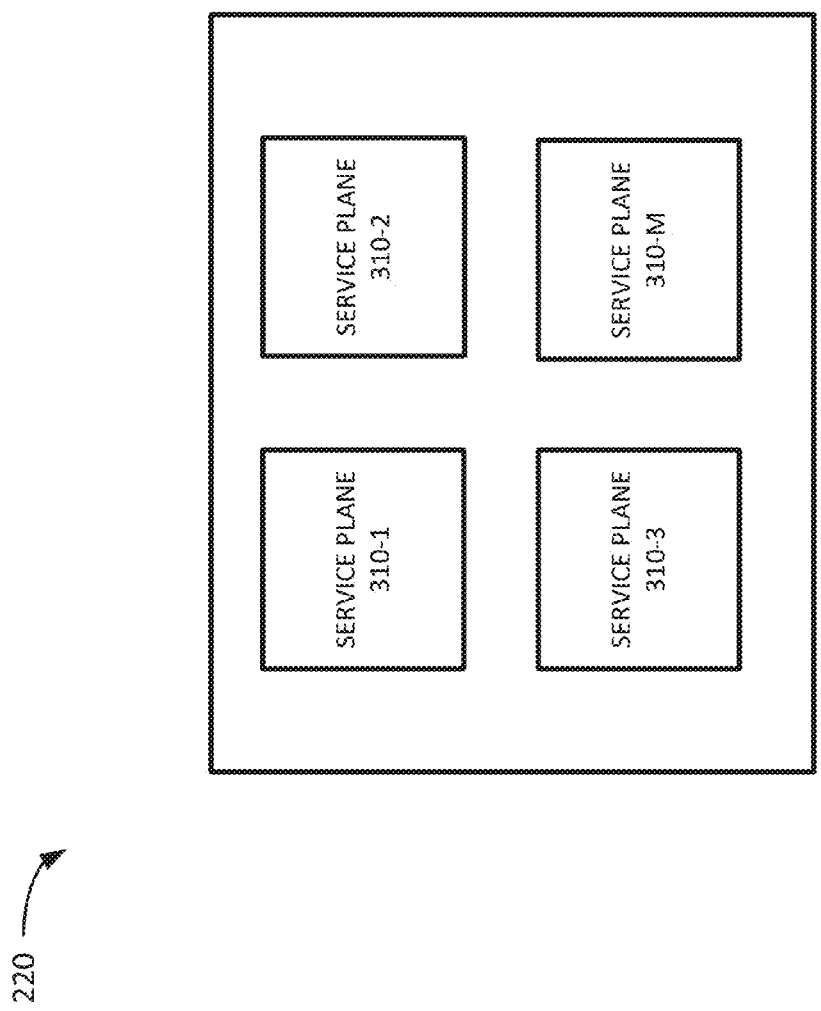

EXTERNAL SERVICE PLANE

RELATED APPLICATION

This application is a continuation of U.S. patent application Ser. No. 13/688,718, filed Nov. 29, 2012 (now U.S. Pat. No. 9,100,342), which is incorporated herein by reference.

BACKGROUND

A router may receive network traffic via an interface. The router interface may include a service plane. The service plane may be associated with a service level agreement that determines different types of services, such as security services, that may be applied to the incoming network traffic.

SUMMARY

According to some example implementations, a network device may receive network traffic from a first device; identify, based on the network traffic and a service level agreement, stored by the network device, that a service is to be applied to the network traffic; send the network traffic, based on the service level agreement, to a second device, the second device using a service plane to apply the service to the network traffic; receive the network traffic from the second device, the network traffic having the service applied by the second device; and send the network traffic, having the service applied by the second device, to a third device.

According to some example implementations, a method, performed by a network device, may include receiving network traffic from a first device; identifying, based on receiving the network traffic and a service level agreement stored by the network device, that the network traffic requires a service; sending, by the network device, based on the service level agreement, network traffic to a second device, the second device applying the service to the network traffic using a service plane, the service plane being offloaded from the network device to the second device; receiving, by the network device, the network traffic from the second device, the network traffic having the service applied using the service plane; and sending, by the network device, the network traffic, having the service applied using the service plane to a third device.

According to some example implementations, a computer-readable medium for storing instructions may include a group of instructions which, when executed by one or more processors of a network device, cause the one or more processors to receive network traffic from a first device; identify, based on the network traffic and a service level agreement, stored by the network device, that a service is to be applied to the network traffic; send the network traffic, based on the service level agreement, to a second device, the second device applying the network traffic using a service plane, the service plane being offloaded from the network device to the second device; receive the network traffic from the second device, the network traffic having the service applied using the service plane; and send the network traffic, having the service applied using the service plane, to a third device.

BRIEF DESCRIPTION OF DRAWINGS

The accompanying drawings, which are incorporated in and constitute a part of this specification, illustrate one or more implementations described herein and, together with the description, explain these implementations. In the drawings:

FIG. 3B is a diagram of example functional components of a device of FIG. 2;

DETAILED DESCRIPTION

The following detailed description refers to the accompanying drawings. The same reference numbers in different drawings may identify the same or similar elements.

An implementation, described herein, may provide for an external service plane hosted by a device, other than a router, that renders a service to network traffic that passes through the router. The external service plane permits the router to continue to provide control, forwarding, and service functions for network traffic (entering the router) as if the network traffic was receiving a service from a service plane in the router.

Figure 1A:
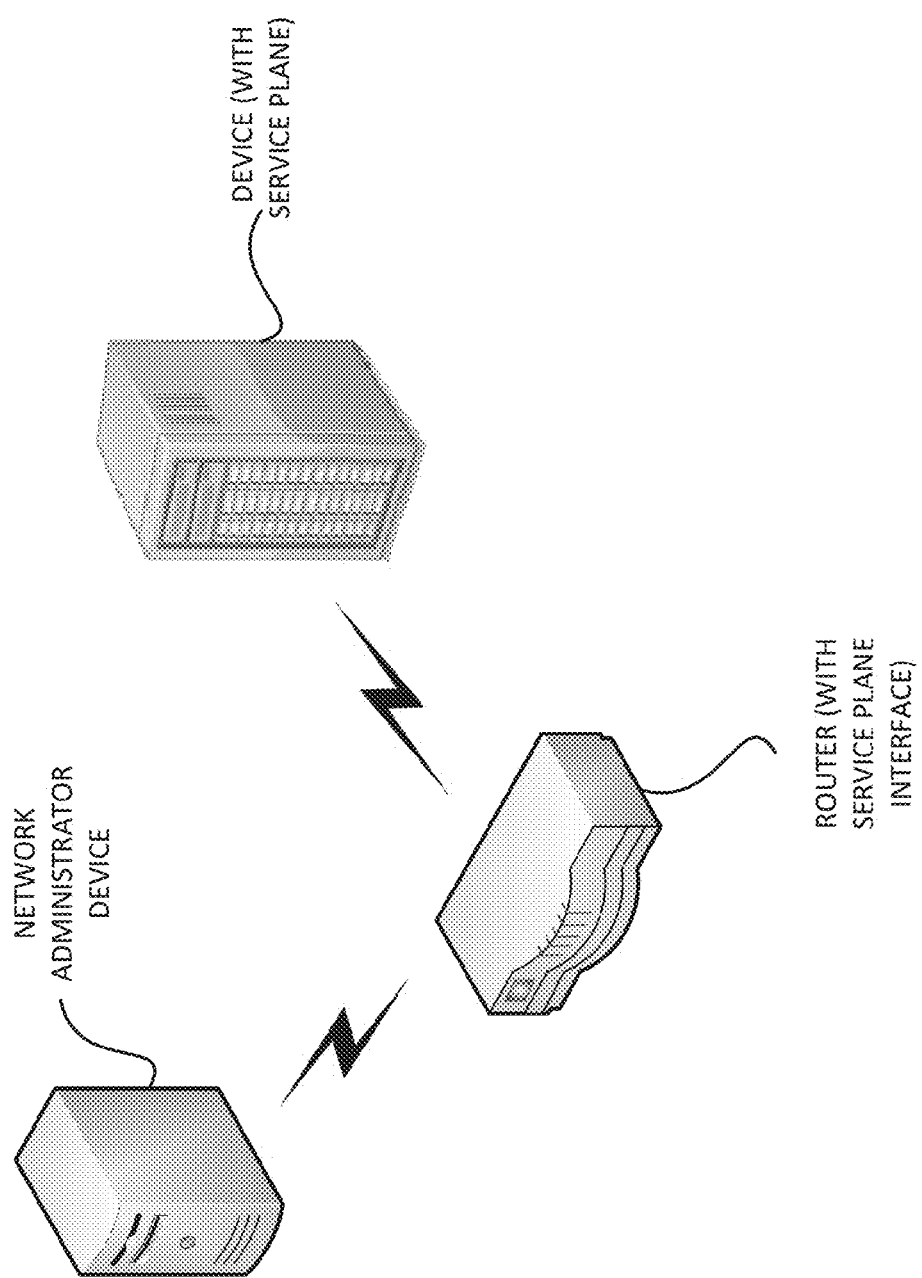
FIGS. 1A-1B are diagrams of an overview of an implementation described herein.
Figure 1B:
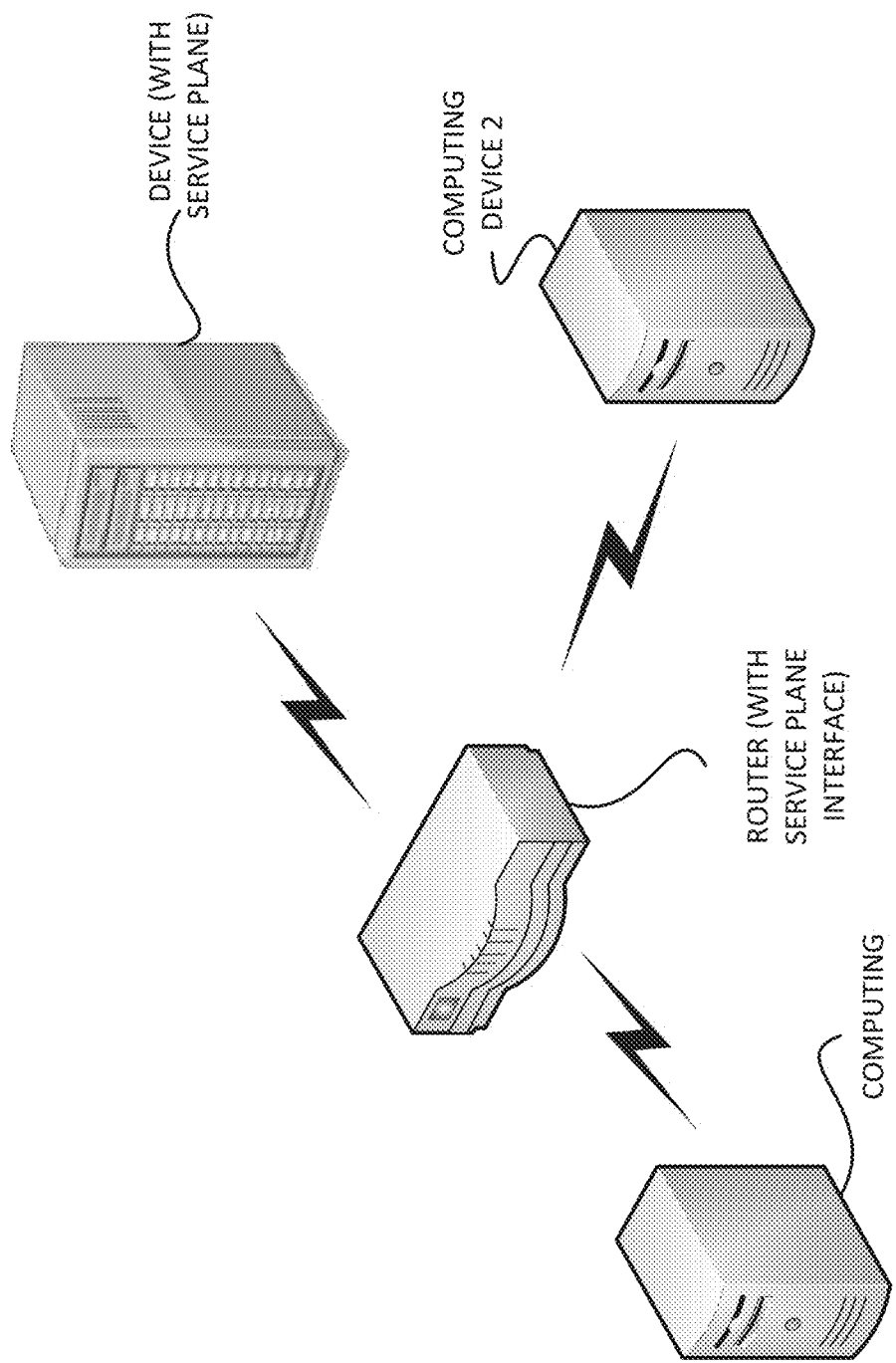

FIGS. 1A-1B are diagrams of an overview of an implementation described herein. As shown in FIG. 1A, a router may be connected, via a network, to a network administrator device. The network administrator device may have stored a service level agreement that provides instructions on providing a service to network traffic associated with a customer of the network. The network administrator device may send the service level agreement information to the router. The router, based on the service level agreement information, may determine that two service planes are needed to provide enough bandwidth capacity for the network traffic associated with the customer. The router may send an instruction to the device to create two service planes. The device may receive the instruction and create two service planes. Further, the router may create a service plane interface within the router that will interact with the service planes in the device. With the service planes implemented in the device and the service plane interfaces implemented in the service plane interface, the router may provide network traffic (associated with the customer) with the service.

As shown in FIG. 1B, computing device 1 may send network traffic to computing device 2. Based on the service level agreement (discussed in FIG. 1A), assume that a firewall service is to be applied to the network traffic. The router receives the network traffic and determines that the firewall service is to be applied to the network traffic based on the service level agreement information stored in the router. The router may send, via the service plane interface, the network traffic to the device. The device, using the service planes, may apply the firewall service to the network traffic. The device may send the network traffic, to which the firewall service has been applied, back to the router, via the service plane interface. The router may receive the network traffic and forward the network traffic to computing device 2.

By moving service planes from the router to a device external to the router, the router may be capable of providing a greater quantity of services than possible if the service planes are located on the router. Moreover, the quantity of service planes may easily be increased or decreased as the capacity requirements of the services, required by the network traffic, increases or decreases. Further, in some implementations, the service plane may be associated with an interface on the router. In this way, the router may retain the same relationship between the service plane and the other functions in the router as if the service plane was located on the router.

Figure 2:
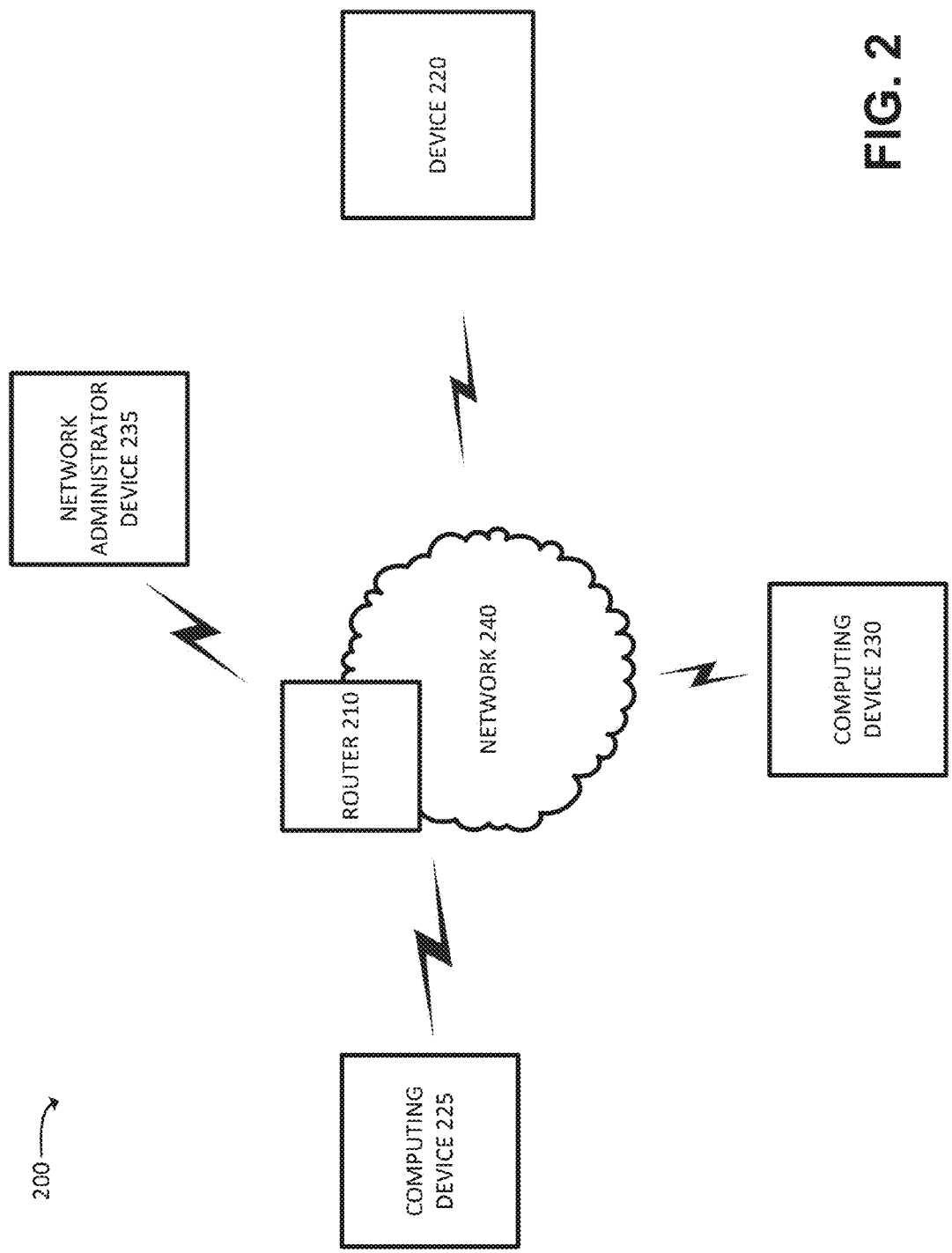
FIG. 2 is a diagram of an example environment in which systems and/or methods described herein may be implemented.

FIG. 2 is a diagram of an example environment 200 in which systems and/or methods described herein may be implemented. In some implementations, environment 200 may include a collection of devices associated with a private network, such as a corporate network, a residential network, or the like. In some implementations, environment 200 may include a collection of devices associated with a public network or a combination of a private network and a public network.

As shown in FIG. 2, environment 200 may include a router 210, a device 220, a computing device 225, a computing device 230, a network administrator device 235, and a network 240.

Router 210 may include a network device, such as a switching device, a routing device, a gateway device, a bridging device, or the like. Router 210 may communicate with device 220, to apply service to network traffic sent between computing device 225 and computing device 230. Although illustrated as being within network 240, in some implementations, router 210 may be located outside of network 240.

Device 220 may include a device that is capable of providing services (e.g., firewall, authentication, deep packet inspection, etc.) to network traffic being sent to router 210. Device 220 may be capable of concurrently running multiple service planes. Each service plane may be associated with a particular service and/or a particular capacity level. Device 220 may directly connect to router 210 or may be remotely located from router 210.

Computing device 225 and computing device 230 may include devices that are capable of communicating with a network. For example, computing devices 225 and computing device 230 may include a personal computer, a laptop, a cellular phone, a smart phone, a server, a printer, and/or any other type of device capable of communicating with a network.

Network administrator device 235 may include one or more devices capable of providing administration services to devices associated with network 240. For example, network administrator device 235 may implement policies and rules by sending information (e.g., instructions on implementing policies associated with a service level agreement) to other network devices (e.g., router 210).

Network 240 may include one or more networks, such as a wide area network (WAN) (e.g., the Internet), a local area network (LAN), a metropolitan area network (MAN), a telephone network (e.g., the Public Switched Telephone Network (PSTN) or a cellular network), a satellite network, or a combination of networks. In some implementations, network 240 may correspond to a private network, a public network, or a combination of a private network and public network.

The example quantity and configuration of devices illustrated in FIG. 2 are provided for simplicity. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
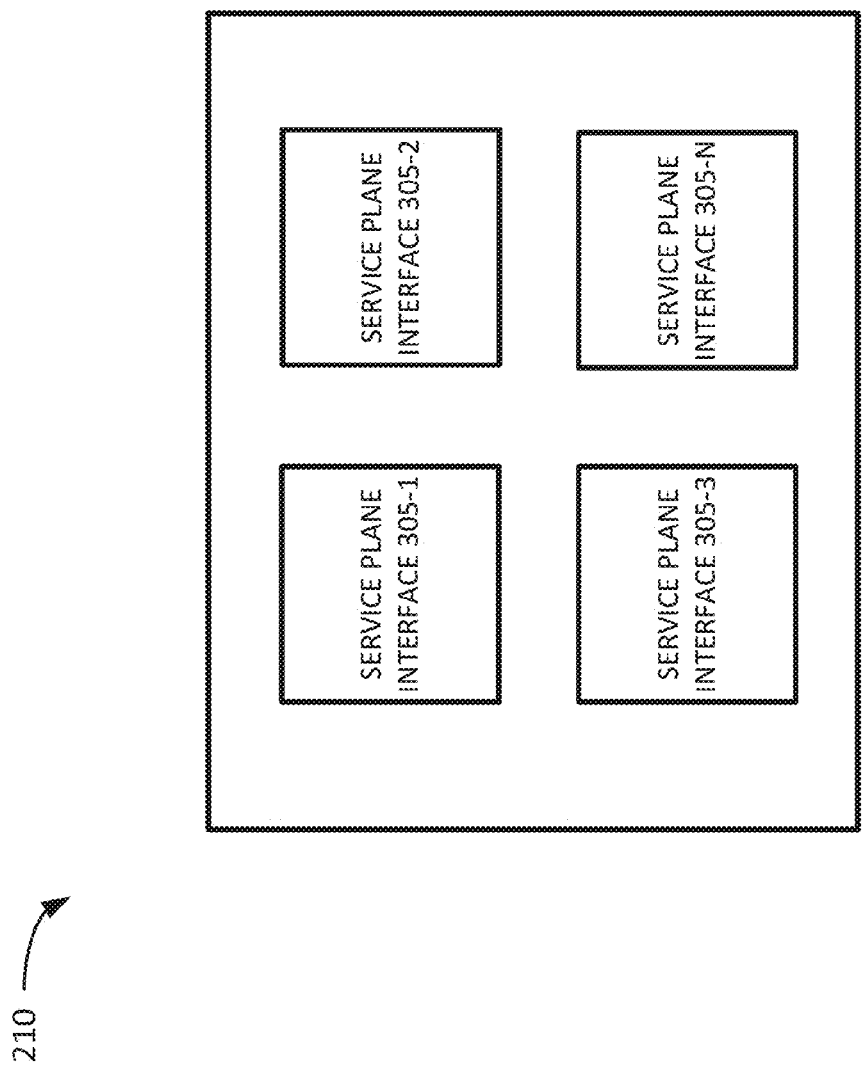
FIG. 3A is a diagram of example functional components of a router of FIG. 2.

FIG. 3A is a diagram of example functional components of router 210. As shown in FIG. 3A, router 210 may include service plane interfaces 305-1 through 305-N(N≥1) (referred to generally as "service plane interfaces 305" and individually as "service plane interface 305").

Each service plane interface 305 may be associated with a service plane in device 220. For example, a single service plane interface 305 may be associated with one device 220 and one service plane in device 220. Alternatively, a single service plane interface 305 may be associated with one device 220 and multiple service planes in that one device 220. Alternatively, a single service plane interface 305 may be associated with multiple serviced planes in multiple devices 220.

The example quantity and configuration of functional components illustrated in FIG. 3A are provided for simplicity. In practice, device 220 may include additional functional components, fewer functional components, different functional components, or differently-arranged functional components than illustrated in FIG. 3A.

FIG. 3B is a diagram of example functional components of device 220. As shown in FIG. 3B, device 220 may include service planes 310-1 through 310-N(N≥1) (referred to generally as "service planes 310" and individually as "service plane 310").

Each service plane 310 may include a software implementation of a physical machine (e.g., a computer) that executes programs like a physical machine. In some implementations, as described above, a service plane 310 may be associated with a particular type of service identified by a service level agreement. For example, service plane 310 may be associated with services for providing a particular quality of service (QoS), security (firewall, intrusion detection protection, ciphering, etc.), and/or other types of services. In some implementations, some service planes 310 may execute the same operating system and/or set of applications. In some other implementations, some service planes 310 may execute different operating systems and/or sets of applications.

Each service plane 310 may be created upon a command from router 210. For example, router 210 may send a command to device 220 to create a service plane 310 based on fulfilling the requirements of a service level agreement. Router 210 may interact with a service plane 310, in device 220, via a service plane interface in router 210.

The example quantity and configuration of components illustrated in FIG. 3B are provided for simplicity. In practice, device 220 may include additional functional components, fewer functional components, different functional components, or differently-arranged functional components than illustrated in FIG. 3B.

Figure 4A:
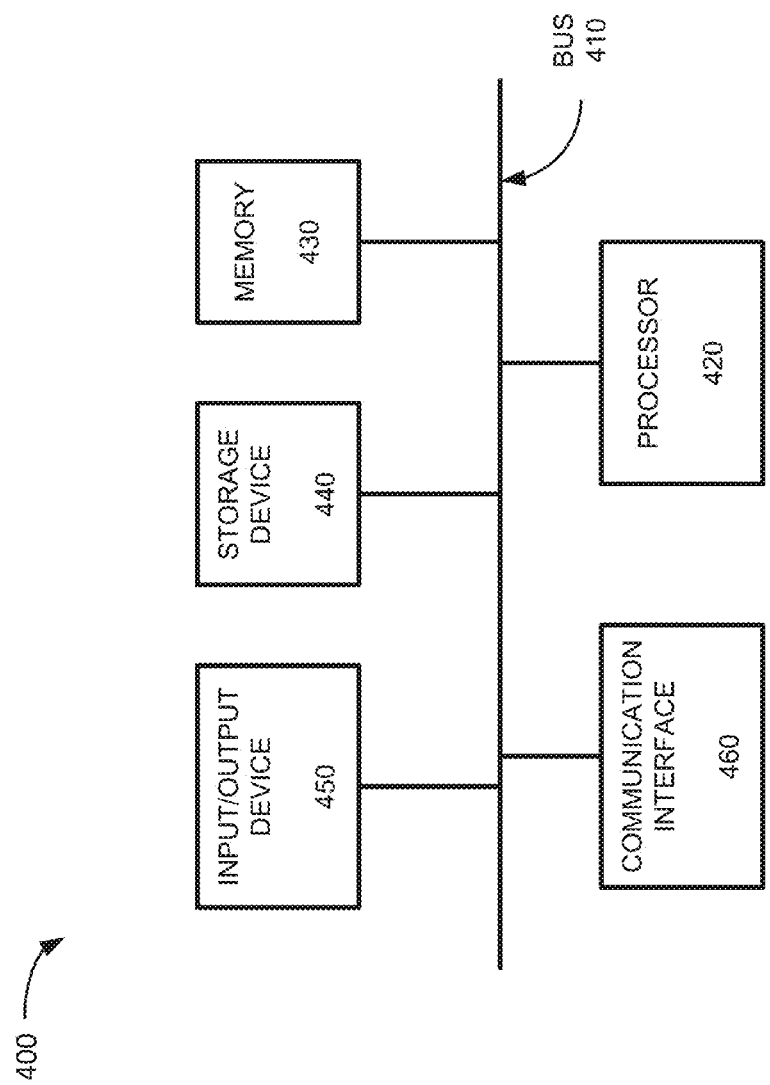
FIG. 4A is a diagram of example components of one or more devices of FIG. 2.

FIG. 4A is a diagram illustrating example components of a device 400. Device 400 may correspond to one or more of the devices illustrated in FIG. 2. For example, device 220, computing device 225, network administrator 235, and/or computing device 230 may include one or more devices 400 and/or one or more components of device 400.

As shown in FIG. 4A, device 400 may include a bus 410, a processor 420, a memory 430, a storage device 440, an input/output device 450, and a communication interface 460. Bus 410 may include a path, or a collection of paths, that permits communication among the components of device 400.

Processor 420 may include a processor, a microprocessor, an application specific integrated circuit (ASIC), a field programmable gate array (FPGA), or another type of processing component that interprets and executes instructions. Memory 430 may include a random access memory (RAM) or another type of dynamic storage device that stores information and/or instructions for execution by processor 420; a read only memory (ROM) or another type of static storage device that stores static information and/or instructions for use by processor 420; and/or another type of memory, such as a hard drive, a cache, or a flash memory. Storage device 440 may include a recording medium to store data that may be used by processor 420.

Input/output device 450 may include a component that permits an operator to input information to device 400, such as a button, a keyboard, a keypad, a touch screen display, or the like; and/or a component that outputs information to the operator, such as a light emitting diode (LED), a display, a speaker, or the like.

Communication interface 460 may include any transceiver-like component that enables device 400 to communicate with other devices and/or systems. For example, communication interface 460 may include a separate transmitter and receiver, or a transceiver that combines the functionality of both a transmitter and a receiver. Communication interface 460 may include a wired interface, a wireless interface, or both a wired interface and a wireless interface.

Device 400 may perform certain operations, as described in detail below. According to an example implementation, device 400 may perform these operations in response to processor 420 executing sequences of instructions contained in a computer-readable medium, such as memory 430. A computer-readable medium may be defined as a non-transitory memory device. A memory device may include space within a single physical storage device or spread across multiple physical storage devices.

The software instructions may be read into memory 430 from another computer-readable medium, such as storage device 440, or from another device via communication interface 460. The software instructions contained in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

While FIG. 4A shows device 400 as having a particular quantity and arrangement of components, in some implementations, device 400 may include additional components, fewer components, different components, or differently-arranged components.

Figure 4B:
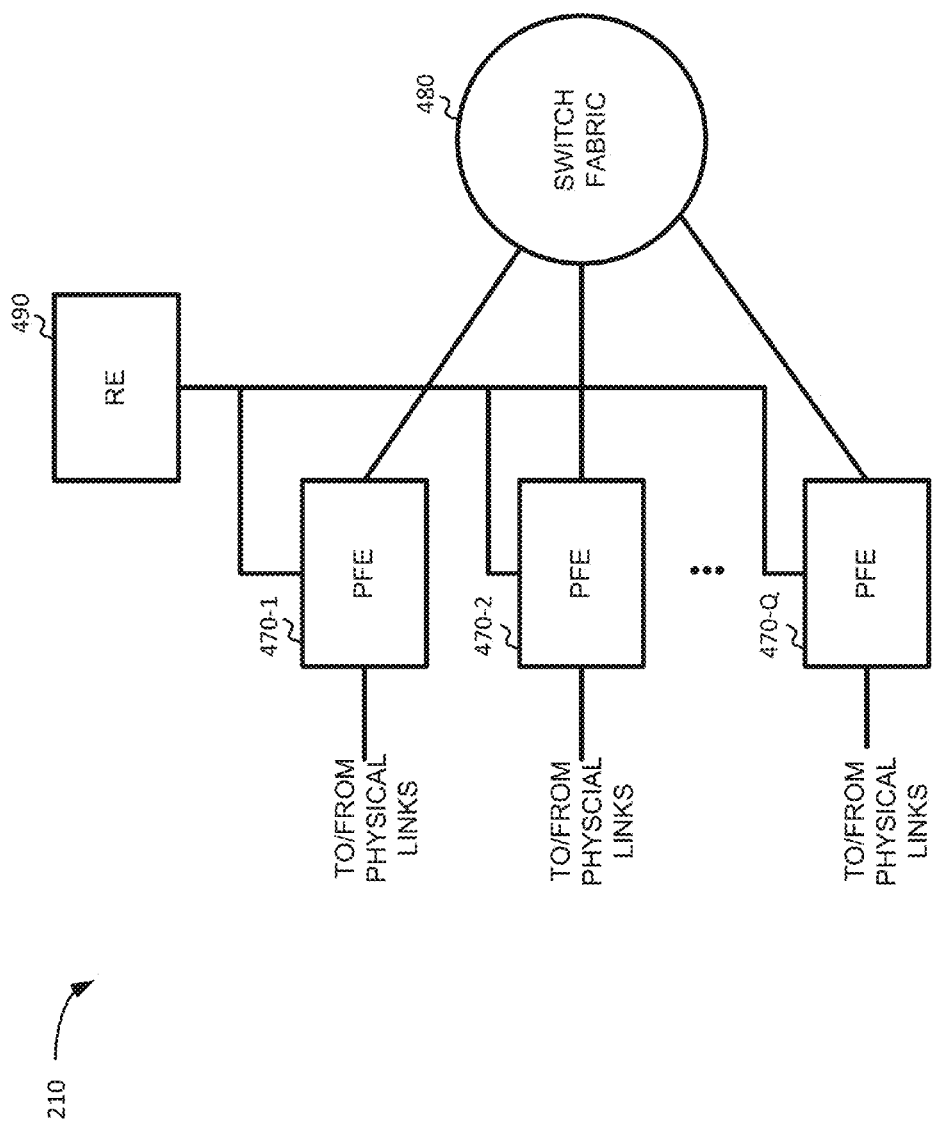
FIG. 4B is a diagram of example components of the router of FIG. 2.

FIG. 4B is a diagram of example components of router 210. As shown in FIG. 4B, router 210 may include packet forwarding engines (PFEs) 470-1, 470-2, . . . , 470-Q (collectively referred to as "PFEs 470" and individually as "PFE 470"), a switch fabric 480, and a routing engine (RE) 490. In another implementation, router 210 may include additional components, fewer components, different components, or differently arranged components than are shown in FIG. 2. For example, router 210 may include other input/output units instead of/besides PFEs 470.

PFEs 470 may each be connected to RE 490 and switch fabric 480. Each one of PFEs 470 may correspond to an input/output port of device 220. PFE 470 may include a component or collection of components to receive packets, to process incoming and/or outgoing packets, and/or to transmit outgoing packets. For example, PFE 470 may include I/O ports, an Ethernet interface and/or another type of interface, a central processing unit (CPU), and/or a memory device. PFE 470 may include a collection of ports that connect, via physical links, to devices in network 240, such as device 220. PFE 470 may include packet processing component(s), switch interface component(s), Internet processor component(s), memory device(s), etc. Each one of PFEs 470 may also represent a separate router.

PFE 470 may perform certain operations on incoming and/or outgoing packets, such as decapsulation, encapsulation, demultiplexing, multiplexing, queuing, dequeuing, etc. operations, which may facilitate the processing and/or transportation of incoming and/or outgoing packets. PFE 470 may receive incoming packets and may forward the incoming packets to other PFEs 470 via switch fabric 480. For example, PFE 470 may receive incoming packets and may determine to which other PFEs 470 the incoming packets may be sent based on a forwarding table (e.g., received from RE 480).

PFE 470 may perform incoming packet buffering operations. For example, PFE 470 may receive packets and may remove header information from the packet. PFE 470 may perform a segmentation operation on the packet data (e.g., on the data payload portion of the packet) by breaking the packet data into fixed-length fragments (herein, referred to collectively as "data units" and individually as a "data unit"). PFE 470 may generate control blocks to store packet control information associated with the data units. PFE 470 may store the data units in a data memory and may store the control blocks in a control memory.

PFE 470 may perform outgoing packet buffering operations. For example, PFE 470 may retrieve control blocks from control memory and may remove control protection information from the control blocks (e.g., checksum information and/or other forms of control protection information). From the control protection information, PFE 470 may perform a data integrity operation to determine whether the packet control information, obtained from the control blocks, contains an error. PFE 470 may, based on the packet control information, retrieve data units from data memory and may reorder/reassemble the data units into outgoing packets for transmission to the next PFE 470 and/or other network device.

Switch fabric 480 may include one or more switching planes to facilitate communication among PFEs 470 and/or RE 490. In some implementations, each of the switching planes may include a single or multi-stage switch of crossbar elements. In some implementations, each of the switching planes may include some other form of switching elements. Switch fabric 480 may also, or alternatively, include processors, memories, and/or paths that permit communication among PFEs 470 and/or RE 490.

Switch fabric 480 may receive information from one of PFEs 470 and may send the information to one or more other PFEs 470. For example, switch fabric 480 may receive control blocks (e.g., requests) and/or data units from PFE 470 via which an incoming packet was received and may forward the control blocks and/or data units to PFE 470 via which an outgoing packet may be transmitted.

RE 490 may include a processor, a microprocessor, or some form of hardware logic (e.g., an application specific integrated circuit (ASIC) or a field programmable gate array (FPGA)). In some implementations, for example, RE 490 may include an Ethernet controller and/or another controller device. RE 490 may perform high-level management functions for router 210. For example, RE 490 may communicate with other networks and/or systems connected to router 210 to exchange information regarding network topology. RE 490 may create a routing table based on the network topology information, create forwarding table(s) based on the routing table, and may forward the forwarding table(s) to PFEs 470. RE 490 may also perform other general control and monitoring functions for router 210.

While FIG. 4B shows router 210 as having a particular quantity and arrangement of components, in some implementations, router 210 may include additional components, fewer components, different components, or differently-arranged components.

Figure 5:
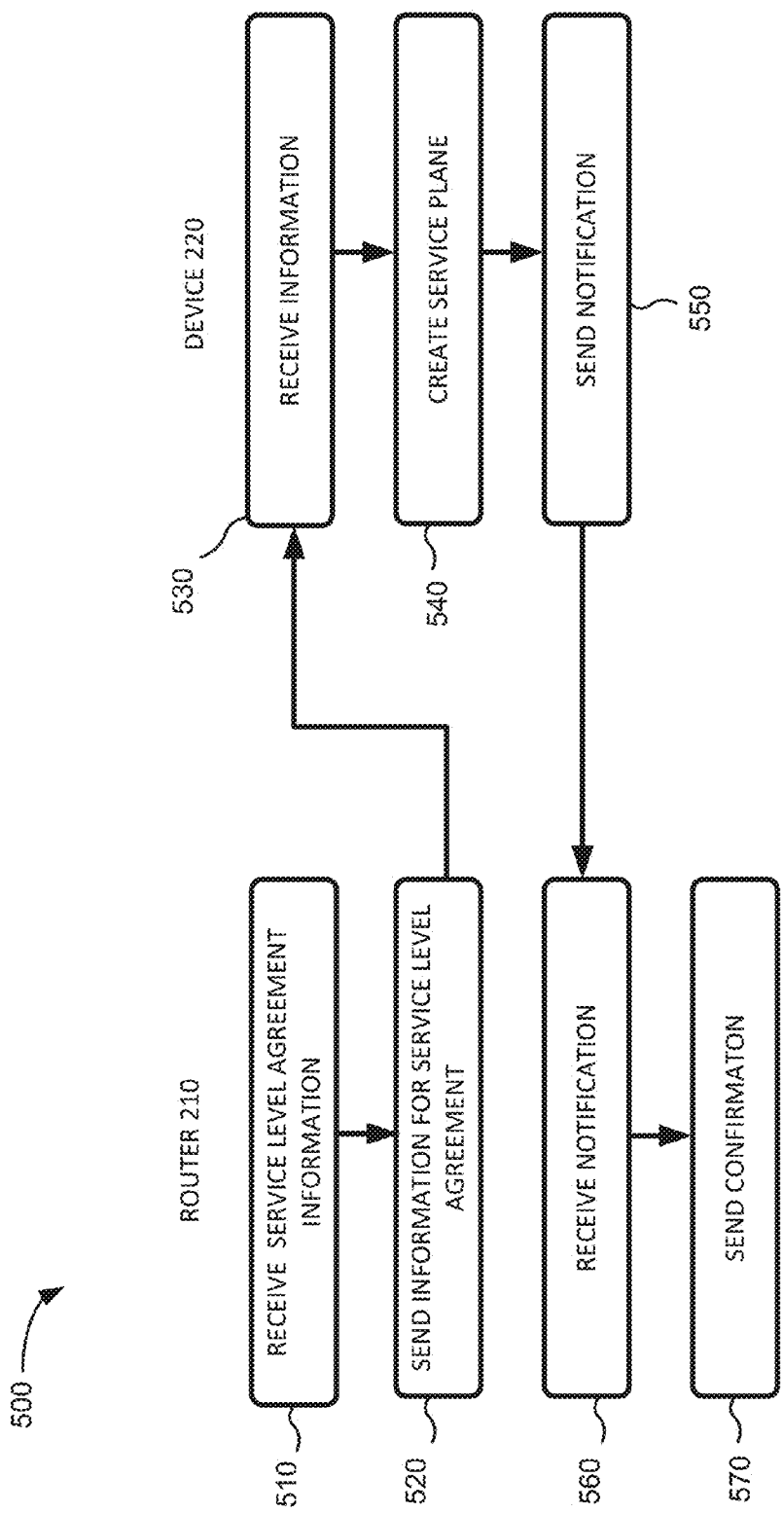
FIG. 5 is a flow chart of an example process for setting up a service plane.

FIG. 5 is a flow chart of an example process 500 for setting up a service plane. While FIG. 5 shows process 500 as including a particular sequence of interactions among router 210 and device 220, in some implementations, some of these interactions may occur in another order or in parallel. Moreover, some of the blocks of process 500 may be performed by a different device or group of devices, including or excluding router 210 and device 220.

Process 500 may including receiving service level agreement information (block 510). For example, router 210 may receive information associated with a service level agreement from network administrator device 235. The service level agreement may include information that identifies the types of services that may be applied to network traffic sent via router 210, such as firewall services, deep packet inspection services, ciphering services, and/or other types of services. The information may also include information regarding different factors associated with the types of services, such network traffic bandwidth requirements associated with requested throughput, memory requirements, and/or any other information associated with performance, availability, serviceability, and/or other factors associated with the service level agreement.

Router 210 may receive additional service level agreements for other types of network traffic. For example, router 210 may receive a service level agreement for providing a ciphering service to network traffic and router 210 may also receive an additional service level agreement for providing deep packet inspection services.

Process 500 may include sending the information associated with the service level agreement (block 520). For example, router 210 may provide the service level agreement information to device 220. As described above, the service level agreement information may be associated with one or more different factors associated with providing a service to network traffic sent via router 210. Router 210 may use RE 490 (in router 210) to determine a device 220 to which to send the information. RE 490 may send information identifying device 220 to PFE 470. PFE 470 may send the service level agreement information to device 220. PFE 470 may use different tunneling processes, such as virtual local area network (VLAN), generic routing encapsulation (GRE), multiprotocol label switching (MPLS), or another type of tunnel transportation, to send the information associated with the service level agreement.

Router 210 may communicate with one or more devices 220 by a direct connection (e.g., a wired connection). Alternatively, router 210 may communicate with device 220 by a path that may use intermediary network devices (e.g., such as another router 210 through a network such as an IP based network).

Process 500 may include receiving the information associated with the service level agreement (block 530). For example, device 220 may receive the information from router 210.

Process 500 may include creating the service plane (block 540). For example, device 220 may receive the information associated with the service level agreement and create the service planes in device 220 according to the service level agreement. Device 220 may create one or more service planes to fulfill one or more conditions of the service level agreement. For example, device 220 may receive information from router 210 that the network traffic may request 10 gigabyte (GB) per second of bandwidth, and/or may request 20 GB of memory capacity. Based on the bandwidth request and/or the memory request, device 220 may create one or more service planes 310 to fulfill the 10 GB bandwidth per second request and/or the 20 GB memory capacity request.

Process 500 may include sending a notification (block 550). For example, device 220 may send a notification to router 210 that the service planes have been created according to the information associated with the service level agreement. Device 220 may send the notification to router 210 via the transportation methods as described in block 520.

Process 500 may include receiving the notification (block 560). Router 210 may receive the notification from device 220. Router 210 may store the notification. The notification may be used by router 210 to create one or more service plane interfaces 305. Each service plane interface 305 may communicate with one or more devices 220 and/or one or more service planes 310.

Process 500 may include sending a confirmation (block 570). For example, router 210 may send a confirmation to network administrator device 235 that the service planes have been created for the service level agreement.

At a later time, network administrator device 235 may send changes, to the service level agreement, to router 210. For example, network administrator device 235 may receive an updated service level agreement that requires greater or fewer service planes. Network administrator device 235 may send an update to router 210. Router 210 may provision device 220 (in a manner similar to that described with regard to FIG. 5) to increase the number of service planes 310 or decrease the number of service planes 310.

While FIG. 5 shows process 500 as including a particular quantity and arrangement of blocks, in some implementations, process 500 may include fewer blocks, additional blocks, or a different order of blocks. Additionally, or alternatively, some of the blocks may be performed in parallel.

Figure 6:
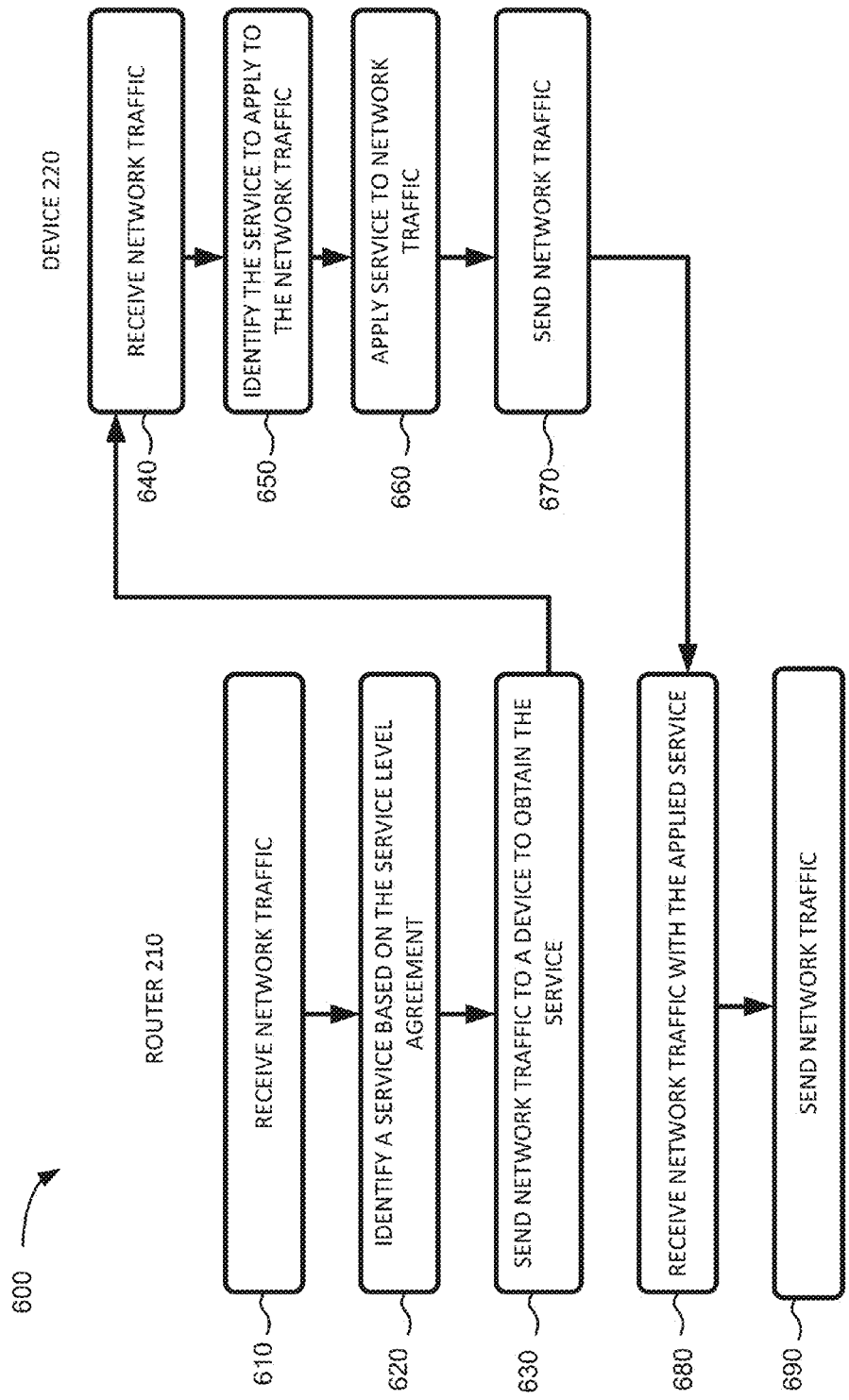
FIG. 6 is a flow chart of an example process for applying a service to network traffic.

FIG. 6 is a flow chart of an example process 600 for applying a service to network traffic. While FIG. 6 shows process 600 as including a particular sequence of interactions among router 210 and device 220, in some implementations, some of these interactions may occur in another order or in parallel. Moreover, some of the blocks of process 600 may be performed by a different device or group of devices, including or excluding router 210 and device 220.

Process 600 may include receiving network traffic (block 610). For example, router 210 may receive network traffic from computing device 225 or some other network device. The network traffic may require a service, such as authentication services, deep packet inspection services, and/or any other type of service.

Process 600 may include identifying a service based on the service level agreement. (block 620). For example, router 210 may identify the particular service level agreement based on an identifier associated with the network traffic (e.g., identifier for the source of the network traffic, the identifier for the destination of the network traffic, and/or identifier associated with the network traffic). Router 210 may identify the service, for the network traffic, by the using the service level agreement (described with regard to block 510 in FIG. 5) stored by router 210.

Process 600 may include sending the network traffic to a device to obtain the service (block 630). For example, router 210 may send the network traffic to device 220 to obtain the service identified by the service level agreement. Router 210 may use PFE 470 to send the network traffic to device 220 via service plane interface 305. PFE 470 may receive a message from RE 490 to send the network traffic to a particular device 220. PFE 470 may establish a tunnel to particular device 220. PFE 470 may then transmit the network traffic to particular device 220 via the tunnel.

In one example implementation, PFE 470 may send the network traffic to device 220. In another example implementation, PFE 470 may send the traffic to a group of devices 220.

In either of the above examples, service plane interface 305 may allow router 210 to interact with device 220 and obtain services for received network traffic as if service plane 310 was located in router 210 instead of device 220. For example, router 210 may determine which network traffic (e.g., by filtering) is permitted to receive a particular service and router 210 may send the network traffic to service plane 310 via service plane interface 305 as if router 210 is using a service plane located in router 210 to provide the service to the network traffic.

Additionally, router 210 may use PFE 470 and/or RE 490 (in conjunction with service plane interface 305) to distribute network traffic (e.g., using load balancing services, such as equal cost multipath routes (ECMP)) to one or more service planes 310 located in one or more devices 220 as if PFE 470 and/or RE 490 are distributing network traffic to one or more service planes in router 210.

Additionally, PFE 470 and/or RE 490 may divert network traffic from one or more service planes 310 in a failed device 220 (e.g., that is no longer operating due to a malfunction) to one or more service planes 310 in other devices 220 as if network traffic is being sent to a service plane in router 210.

Process 600 may include receiving the network traffic (block 640). For example, service plane 310, in device 220, may receive network traffic from router 210 via service plane interface 305.

Process 600 may include identifying the service to apply to the network traffic (block 650). For example, device 220 may identify the type of service to apply to the network traffic based on the service level agreement information stored in device 220 (described with regard to block 540 in FIG. 5).

Process 600 may include applying the service to the network traffic (block 660). For example, device 220 may, using service plane 310, apply the service to the network traffic based on the service level agreement. Service plane 310 may apply one or more of a plurality of services to the network traffic. For example, service plane 310, based on the service level agreement, may apply a level of quality of service (QoS) to the network traffic. Additionally, or alternatively, service plane 310, based on the service level agreement, may apply a level of security to the network traffic, such as firewall, ciphering, authentication services, and/or any other type of security services. Additionally, or alternatively, service plane 310, based on the service level agreement, may apply services such as network address translation (NAT), deep packet inspection, and/or another type of service.

Process 600 may include sending the network traffic with the applied service (block 670). Device 220 may send the network traffic with the applied service to service plane interface 305 in router 210. Device 220 may send the network traffic by using a transportation process such as VLAN, GRE, IP/GRE, MPLS, and/or any other type of transportation process described with regard to block 630.

Process 600 may include receiving the network traffic (block 680). For example, router 210 may receive the network traffic via service plane interface 305 in router 210.

Process 600 may include sending the network traffic (block 690). For example, router 210 may send the network traffic to computing device 230. Router 210 may use PFE 470 to send the network traffic to computing device 230.

While FIG. 6 shows process 600 as including a particular quantity and arrangement of blocks, in some implementations, process 600 may include fewer blocks, additional blocks, or a different order of blocks. Additionally, or alternatively, some of the blocks may be performed in parallel.

Figure 7A:
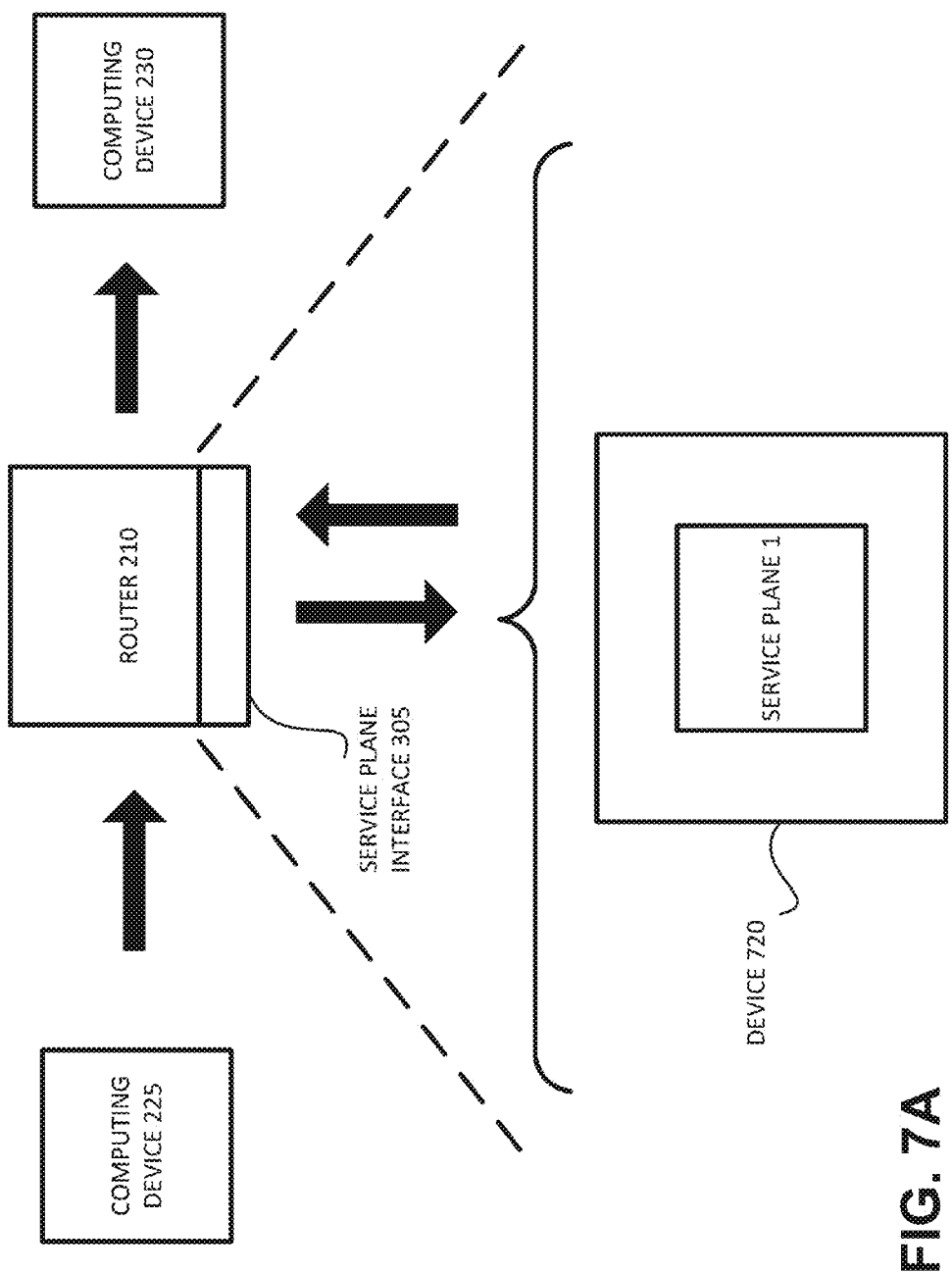
FIGS. 7A-7B are diagrams illustrating an example of a system and/or method described herein.
Figure 7B:
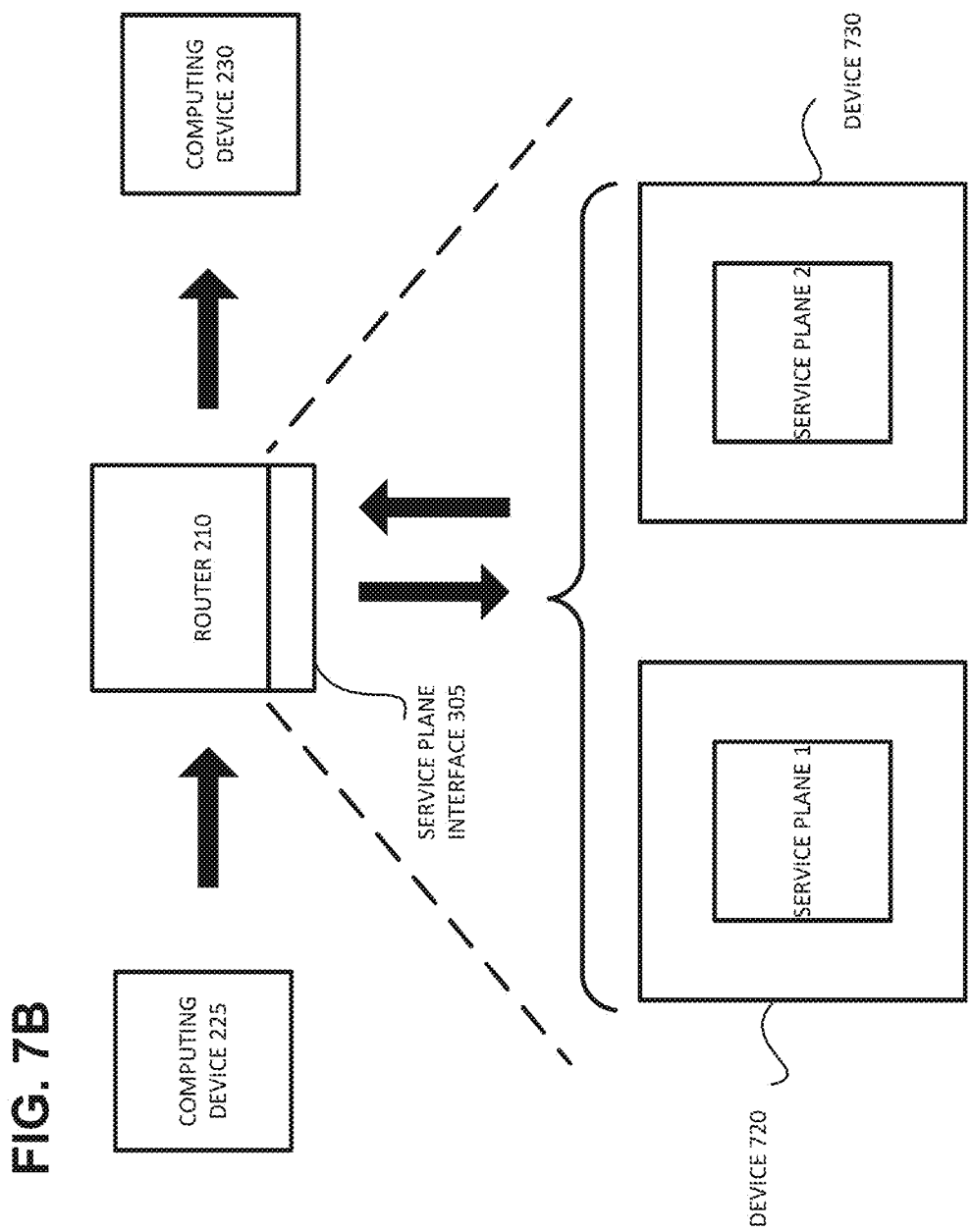

FIGS. 7A-7B are diagrams of an example process for applying a service to network traffic. FIG. 7A shows router 210, computing device 225, computing device 230, and device 720. FIG. 7B shows router 210, computing device 225, computing device 230, device 720, and device 730. Device 720 and device 730 may each correspond to device 220, described with regard to FIGS. 2 and 3B. Assume that the devices shown in FIGS. 7A and 7B communicate with each other via a network, such as network 240. Assume that router 210 has received service level agreement information from a network administrator device (e.g., such as network administrator device 235). Assume that router 210 determines, based on the service level agreement information that a NAT service is to be applied to network traffic from computing device 225 to computing device 230 requiring 5 GB of memory. Thus, router 210 may send an instruction to device 720 to create service plane 1 to fulfill the 5 GB of memory requirement of the service level agreement. Device 720 creates service plane 1 and notifies router 210 that service plane 1 is created. Assume that router 210, based on receiving the notification, creates service plane interface 305 that allows router 210 to obtain the NAT service from service plane 1.

In FIG. 7A, computing device 225 may send network traffic through router 210. Router 210 may determine, based on the service level agreement information, that the incoming network traffic may request a NAT service. Assume that router 210 sends the network traffic from service plane interface 305 to device 720 by using an MPLS tunnel. Device 720 may receive the network traffic from service plane interface 305 in router 210. Device 720 may use service plane 1 to apply the NAT service to the network traffic. Device 720 may send the network traffic to the service plane interface 305 in router 210 using the MPLS tunnel. Router 210 then may send the network traffic to which the NAT service has been applied to computing device 230.

At a later time, assume that router 210 receives an updated service level agreement from a network administrator device (e.g., network administrator device 235 described with regard to FIG. 2). The updated service level agreement may request 10 GB of memory associated with providing the NAT service. Assume that router 210 receives the updated service level agreement and determines, based on the update, that a second service plane is to be allocated to the NAT service. Thus, router 210 may send an instruction to device 730, instructing device 730 to create service plane 2. The creation of service plane 2 along with service plane 1 may provide the 10 GB memory capacity to permit the NAT service to be applied to the network traffic. Both service plane 1 and service plane 2 may communicate with service plane interface 305 in router 210.

As shown in FIG. 7B, computing device 225 may send network traffic through router 210. Router 210 may determine, based on the updated service level agreement, that the incoming network traffic that the NAT service is to be applied. Router 210 may determine (based on the updated service level agreement stored in router 210) that the service is to be provided by using device 720 and device 730. Assume that router 210, using PFE 470 (in router 210) to load balance the network traffic, may send a portion of the network traffic to service plane 1 in device 720 and the remaining portion of the network traffic to service plane 2 in device 730. Device 720, using service plane 1, and device 730, using service plane 2, may render the NAT service to the network traffic. Device 720 and device 730 may send the network traffic to service plane interface 305 (in router 210). Service plane interface 305 may communicate with physical ports in router 210 that will be used to send the network traffic, with the NAT service, to computing device 230.

Implementations, described herein, may provide a system and/or method for providing a service to network traffic, being sent to a router, by using a service plane located in a device other than the router. Even though the service plane is located in another device, the router may continue to provide control, forwarding, and service functions to network traffic as if the network traffic was being sent to a service plane located in the router.

The foregoing description provides illustration and description, but is not intended to be exhaustive or to limit the implementations to the precise form disclosed. Modifications and variations are possible in light of the above disclosure or may be acquired from practice of the implementations.

It will be apparent that aspects described herein may be implemented in many different forms of software, firmware, and hardware in the implementations illustrated in the figures. The actual software code or specialized control hardware used to implement these aspects does not limit the implementations. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first device, first network traffic;
   determining, by the first device, that a service is to be applied to the first network traffic;
   sending, by the first device, the first network traffic to a second device to apply the service to the first network traffic based on determining that the service is to be applied to the first network traffic,
   the service being applied to the first network traffic without using a third device,
   the third device being separate from the second device, and
   an increase in a quantity of service planes being determined based on an updated service level agreement, and
   a service plane being created in the third device based on the increase in the quantity of service planes being determined;
   receiving, by the first device, second network traffic;
   determining, by the first device and after receiving the second network traffic, that the service is to be applied to the second network traffic by the second device and the third device after the service plane is created in the third device;
   sending, by the first device and based on determining that the service is to be applied to the second network traffic by the second device and the third device, a first portion of the second network traffic to the second device to apply the service to the first portion of the second network traffic;
   sending, by the first device and based on determining that the service is to be applied to the second network traffic by the second device and the third device, a second portion of the second network traffic to the third device to apply the service to the second portion of the second network traffic;
   receiving, from the second device, the first portion of the second network traffic after the service is applied to the first portion of the second network traffic; and
   receiving, from the third device, the second portion of the second network traffic after the service is applied to the second portion of the second network traffic.

2. The method of claim 1, where the service is a network address translation (NAT) service.

3. The method of claim 1, where sending the first network traffic to the second device includes:
   sending the first network traffic to the second device using a multi-path label switching tunnel.

4. The method of claim 1, where the updated service level agreement comprises a request for a quantity of memory capacity associated with providing the service.

5. The method of claim 1, further comprising:
   sending, to the third device, an instruction that instructs the third device to create the service plane based on the updated service level agreement.

6. The method of claim 1, further comprising:
receiving, from the third device, a notification that the third device created the service plane.

7. The method of claim 1, where determining that the service is to be applied to the first network traffic comprises:
determining an identifier associated with the first network traffic, and
determining that the service is to be applied to the first network traffic based on the identifier.

8. The method of claim 1, further comprising:
receiving, via a service plane interface of the first device, the first network traffic after the service is applied to the first network traffic.

9. A system comprising:
a first device to:
receive first network traffic;
send the first network traffic to a second device to apply a service to the first network traffic,
the service being applied to the first network traffic without using a third device,
the third device being separate from the second device,
an increase in a quantity of service planes being determined based on an updated service level agreement, and
a service plane to be created in the third device based on the increase in the quantity of service planes being determined;
receive second network traffic;
determine, after the service plane is created in the third device, that the service is to be applied to the second network traffic by the second device and the third device;
send, based on determining that the service is to be applied to the second network traffic by the second device and the third device, a first portion of the second network traffic to the second device to apply the service to the first portion of the second network traffic;
send, based on determining that the service is to be applied to the second network traffic by the second device and the third device, a second portion of the second network traffic to the third device to apply the service to the second portion of the second network traffic;
receive, from the second device, the first portion of the second network traffic after the service is applied to the first portion of the second network traffic; and
receive, from the third device, the second portion of the second network traffic after the service is applied to the second portion of the second network traffic.

10. The system of claim 9, where the service is a deep packet inspection service.

11. The system of claim 9, where the first device is further to:
send the first network traffic to the second device using a multi-path label switching tunnel.

12. The system of claim 9, where, when sending the first network traffic, the first device is to:
determine that the service is to be applied to the first network traffic, and
send the first network traffic to the second device to apply the service to the first network traffic based on determining that the service is to be applied to the first network traffic.

13. The system of claim 9, where the first device is further to:
send, to the third device and based on the updated service level agreement, an instruction that instructs the third device to create the service plane.

14. The system of claim 9, where the first device is further to:
receive, from the third device, a notification that the third device created the service plane.

15. A non-transitory computer-readable medium storing instructions, the instructions comprising:
one or more instructions that, when executed by one or more processors of a first device, cause the one or more processors to:
receive first network traffic;
send the first network traffic to a second device to apply a service to the first network traffic,
the service being applied to the first network traffic without using a third device,
the third device being separate from the second device,
an increase in a quantity of service planes being determined based on an updated service level agreement, and
a service plane being created in the third device based on the increase in the quantity of service planes being determined;
receive second network traffic;
determine, after the service plane is created in the third device, that the service is to be applied to the second network traffic by the second device and the third device;
send, based on determining that the service is to be applied to the second network traffic by the second device and the third device, a first portion of the second network traffic to the second device to apply the service to the first portion of the second network traffic;
send, based on determining that the service is to be applied to the second network traffic by the second device and the third device, a second portion of the second network traffic to the third device to apply the service to the second portion of the second network traffic;
receive, from the second device, the first portion of the second network traffic after the service is applied to the first portion of the second network traffic; and
receive, from the third device, the second portion of the second network traffic after the service is applied to the second portion of the second network traffic.

16. The non-transitory computer-readable medium of claim 15, where the one or more instructions to send the first network traffic to the second device include:
one or more instructions that, when executed by the one or more processors, cause the one or more processors to:
send the first network traffic to the second device using a multi-path label switching tunnel.

17. The non-transitory computer-readable medium of claim 15, where the updated service level agreement comprises a request for a particular capacity associated with providing the service.

* * * * *